(12) United States Patent
Mehta et al.

(10) Patent No.: US 12,271,841 B2
(45) Date of Patent: Apr. 8, 2025

(54) RIDESHARE SERVICE FLEET OPTIMIZATION USING VEHICLE SENSOR DATA

(71) Applicant: GM Cruise Holdings LLC, San Francisco, CA (US)

(72) Inventors: Kunal Mehta, San Francisco, CA (US); Nikola Noxon, San Francisco, CA (US); Devina Jain, San Francisco, CA (US); Curt Patrick Harrington, Philadelphia, PA (US); Kelan Fitzgerald Stoy, Albany, CA (US); Edward Henry Forscher, Oakland, CA (US); Michael John Mehallow, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 126 days.

(21) Appl. No.: 17/538,435

(22) Filed: Nov. 30, 2021

(65) Prior Publication Data

US 2023/0169421 A1    Jun. 1, 2023

(51) Int. Cl.
*G06Q 10/06* (2023.01)
*B60W 40/08* (2012.01)
(Continued)

(52) U.S. Cl.
CPC ....... *G06Q 10/06311* (2013.01); *B60W 40/08* (2013.01); *B60W 60/00253* (2020.02);
(Continued)

(58) Field of Classification Search
CPC . G06Q 10/06311; G06Q 50/30; B60W 40/08; B60W 60/00253; B60W 2540/041;
(Continued)

(56) References Cited

U.S. PATENT DOCUMENTS 10,152,053 B1 * 12/2018 Smith ................ G06Q 10/02
2013/0238167 A1    9/2013 Stanfield et al.
(Continued)

FOREIGN PATENT DOCUMENTS

WO    WO-2019110584 A1 *  6/2019

OTHER PUBLICATIONS

Zengxiang Lei, Xinwu Qian, Satish V. Ukkusuri, "Efficient proactive vehicle relocation for on-demand mobility service with recurrent neural networks," Transportation Research Part C: Emerging Technologies, vol. 117, 2020, (https://www.sciencedirect.com/science/article/pii/S0968090X20305933). (Year: 2020).*
(Continued)

*Primary Examiner* — Robert D Rines
*Assistant Examiner* — Alissa D Karmis

(57) ABSTRACT

A method is described and includes acquiring sensor data produced by sensors of a plurality of vehicles traversing an area including a location of a user, wherein the vehicles traversing the area comprise a subset of a fleet of vehicles for providing rideshare services; processing the acquired sensor data to determine a category of the user; selecting a vehicle from the fleet of vehicles based on the category of the user, wherein the selected vehicle comprises at least one accommodation corresponding to the category of the user; and dispatching the selected vehicle to a pick-up location designated by the user.

20 Claims, 6 Drawing Sheets

(51) Int. Cl.
*B60W 60/00* (2020.01)
*G05D 1/00* (2006.01)
*G06Q 10/0631* (2023.01)
*G06Q 50/40* (2024.01)
*G08G 1/00* (2006.01)

(52) U.S. Cl.
CPC .......... *G05D 1/0291* (2013.01); *G06Q 50/40* (2024.01); *G08G 1/202* (2013.01); *B60W 2540/041* (2020.02); *B60W 2540/221* (2020.02)

(58) Field of Classification Search
CPC .......... B60W 2540/221; G05D 1/0291; G05D 2201/0213; G08G 1/202
See application file for complete search history.

(56) References Cited

U.S. PATENT DOCUMENTS

| | | | | |
|---|---|---|---|---|
| 2016/0335576 | A1* | 11/2016 | Peng | G06Q 10/06315 |
| 2017/0153714 | A1* | 6/2017 | Gao | G05D 1/0088 |
| 2018/0224849 | A1 | 8/2018 | Gordon et al. | |
| 2019/0311454 | A1 | 10/2019 | Mitsumaki et al. | |
| 2019/0385121 | A1* | 12/2019 | Waliany | G06F 9/54 |
| 2020/0023811 | A1* | 1/2020 | Herman | B60R 25/01 |
| 2020/0272143 | A1* | 8/2020 | Scott | G05D 1/223 |
| 2020/0312145 | A1* | 10/2020 | Hintermeister | G09B 21/006 |
| 2021/0123743 | A1* | 4/2021 | Mehta | G06Q 10/047 |
| 2021/0209713 | A1* | 7/2021 | Imtiyaz | G06Q 50/30 |
| 2022/0067869 | A1* | 3/2022 | Warmoth | G06Q 10/06315 |
| 2022/0340176 | A1* | 10/2022 | Haubert | G06V 40/103 |
| 2023/0095845 | A1* | 3/2023 | Wilson | G06V 20/59 |
| | | | | 701/1 |

OTHER PUBLICATIONS

J. Miller and J. P. How, "Demand estimation and chance-constrained fleet management for ride hailing," 2017 IEEE/RSJ International Conference on Intelligent Robots and Systems (IROS), Vancouver, BC, Canada, 2017, pp. 4481-4488, doi: 10.1109/IROS.2017.8206315. (Year: 2017).*

Zhou, Xuan, Ruimin Ke, Hao Yang, and Chenxi Liu. 2021. "When Intelligent Transportation Systems Sensing Meets Edge Computing: Vision and Challenges" Applied Sciences 11, No. 20: 9680. https://doi.org/10.3390/app11209680 (Year: 2021).*

A. P. J. Dwiyantoro, K. Muchtar, F. Rahman, M. Wiryahardiyanto and R. Hardiyanto, "Coarse-to-Fine Object Detection for Ride-Hailing Market Analysis," 2019 16th IEEE Intl Conference on Advanced Video and Signal Based Surveillance (AVSS), Taipei, Taiwan, 2019, pp. 1-6, doi: 10.1109/AVSS.2019.8909887. (Year: 2019).*

* cited by examiner

RIDESHARE SERVICE FLEET OPTIMIZATION USING VEHICLE SENSOR DATA

TECHNICAL FIELD OF THE DISCLOSURE

The present disclosure relates generally to rideshare services provided using autonomous vehicles and, more specifically, to techniques for optimization of a fleet of autonomous vehicles for providing rideshare services using autonomous vehicle sensor data.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS OF THE DISCLOSURE

Overview

Figure 1:
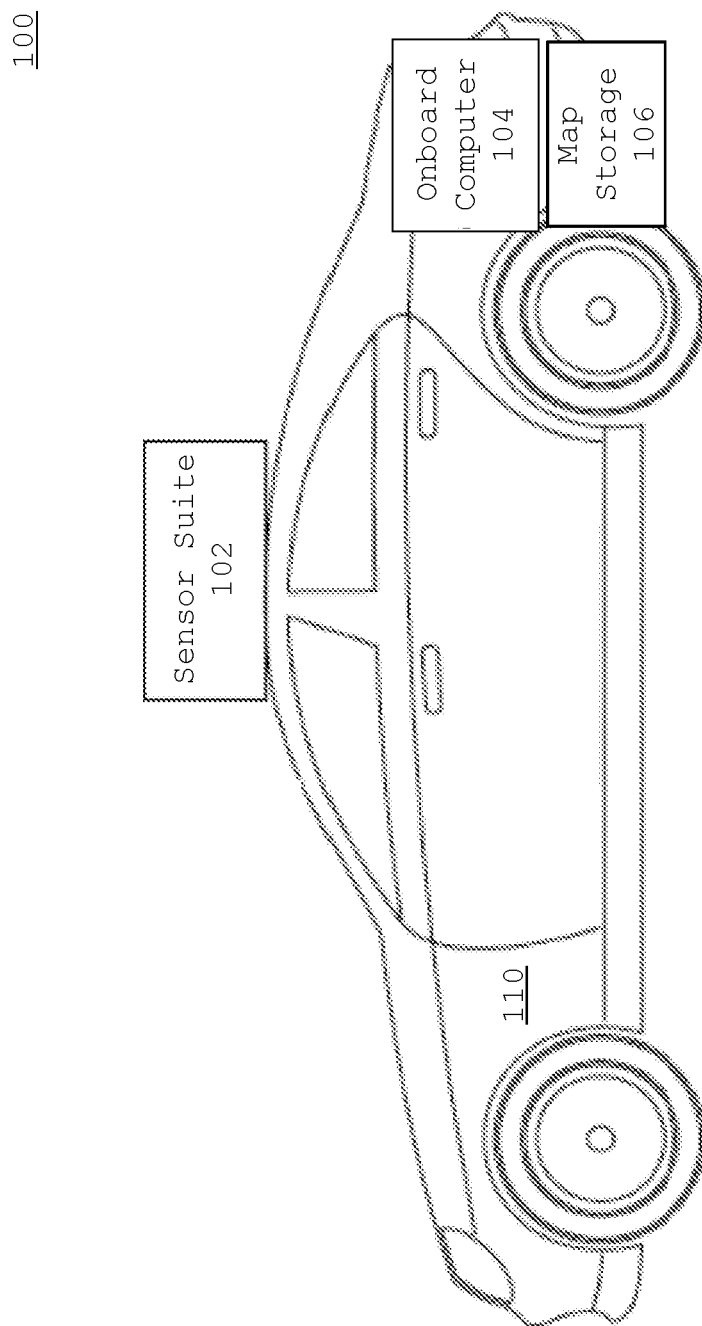
FIG. 1 is a diagram illustrating an example autonomous vehicle that may be deployed in an autonomous vehicle fleet optimization system for providing rideshare services according to some embodiments of the present disclosure.

The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

Given the numerous advantages of ridehail, rideshare, and delivery services (which services may be collectively and/or interchangeably referred to herein simply as "rideshare services" whether for a single user/passenger, multiple users/passengers, and/or one or more items for delivery) provided by autonomous vehicles, it is anticipated that autonomous vehicle rideshare services will soon become the ubiquitous choice for various user transportation and delivery needs, including but not limited to school commutes, airport transfers, long distance road trips, and grocery and restaurant deliveries, to name a few.

One of the challenges for rideshare services is predicting user demand and matching available autonomous vehicles with users. This is even more challenging for rideshare services that offer shared-ride services and/or multiple vehicle types (e.g., extra-large (XL) vehicles, vehicles with extra cargo space, etc.), as user location data alone is not sufficient to enable the service to determine the number of riders in a group of riders hailing a ride or other characteristics of the rideshare user, such as whether the user is traveling with luggage or additional objects (e.g., a wheelchair, a stroller, a bicycle, etc.) that may require cargo space aboard the autonomous vehicle.

Each autonomous vehicle in a fleet of autonomous vehicles for providing rideshare services may have a sensor suite including light detection and ranging (LIDAR) sensors and computer-vision (CV) capabilities. In accordance with features of embodiments described herein, sensor data from the sensor suite may be used to augment user data provided by a user requesting a rideshare service. In particular, using LIDAR and CV sensor data along with user information available to the rideshare provider via a mobile app, mobilization of the rideshare provider's autonomous vehicle fleet can be preemptively optimized to match the demand distribution for certain categories, or types, of users. Such categories may include, but are not limited to, a special needs category and a user cluster category. Special needs of users in the special needs category may include large items of the user to be transported by the autonomous vehicle (e.g., wheelchairs, bikes, strollers, large luggage, etc.) and items may require special accommodations (e.g., extra payload room, a bike rack, a wheelchair restraint system.). A user cluster may be a group of two or more individuals that will be sharing a single autonomous vehicle requested by one of the individuals in the group via the rideshare service mobile app.

Sensor data collected by the autonomous vehicle fleet of the rideshare service provider may be used to augment user data from the rideshare service mobile app, such as user history data (e.g., ride history, rides cancelled, etc.), user profile information, and current location the user, to mobilize the autonomous vehicle fleet and preemptively dispatch autonomous vehicles to these groups of users with the mobile app open. In accordance with features of embodiments described herein, information regarding categories of users (e.g., users with special needs and user clusters) that can be determined from sensor data can be used to preemptively route autonomous vehicles with sufficient space/other accommodations to the general area of the potential users to reduce wait time.

As will be appreciated by one skilled in the art, aspects of the present disclosure, in particular aspects of embodiments described herein, may be embodied in various manners (e.g., as a method, a system, an autonomous vehicle, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or 1 other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Autonomous Vehicle for Use in Fleet Optimization System

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 may be part of a fleet of vehicles for picking up passengers and/or packages and driving to selected destinations. The autonomous vehicle 110 may be configured for ride management by an event host.

The sensor suite 102 includes localization and driving sensors. For example, the sensor suite may include one or more of photodetectors, cameras, radio detection and ranging (RADAR), SONAR, LIDAR, GPS, inertial measurement units (IMUS), accelerometers, microphones, strain gauges, pressure monitors, barometers, thermometers, altimeters, wheel speed sensors, and a CV system. The sensor suite 102 continuously monitors the autonomous vehicle's environment and, in some examples, sensor suite 102 data is used to detect selected events. In particular, data from the sensor suite can be used to update a map with information used to develop layers with waypoints identifying selected events, the locations of the encountered events, and the frequency with which the events are encountered at the identified location. In this way, sensor suite 102 data from many autonomous vehicles can continually provide feedback to the mapping system and the high-fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

The autonomous vehicle 110 is preferably a fully autonomous automobile but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

The autonomous vehicle 110 may include a map storage 106 for storing map data. The autonomous vehicle 110 may use the map data in various driving decisions, e.g., in finding optimal routes, in support of detecting objects along a route such as traffic lights, or for predicting behavior of other road users and planning autonomous vehicle behavior.

Example Autonomous Vehicle Fleet for Use in Fleet Optimization System

Figure 2:
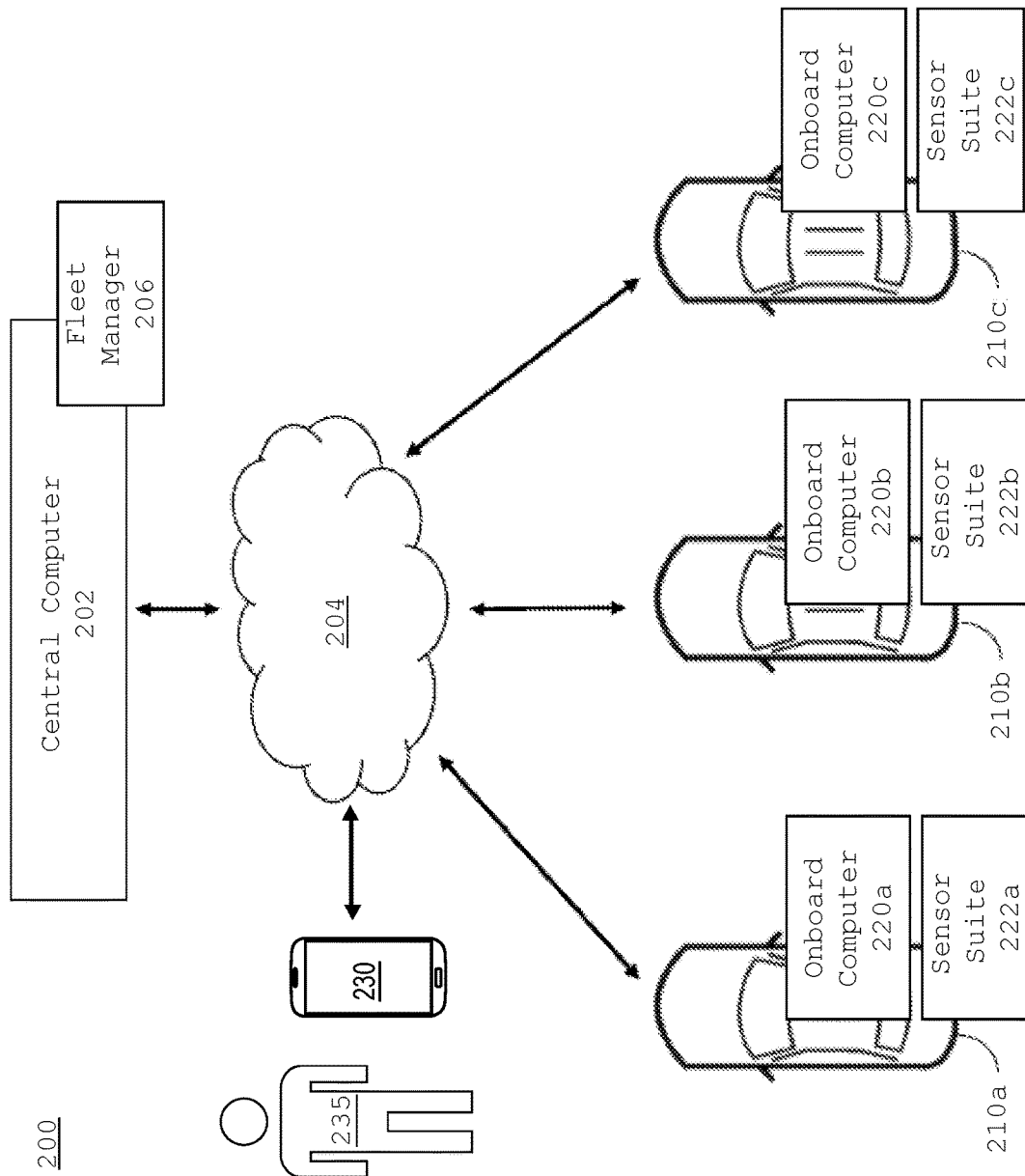
FIG. 2 is a diagram illustrating an example fleet of autonomous vehicles that may be deployed in an autonomous vehicle fleet optimization system for providing rideshare services according to some embodiments of the present disclosure.

FIG. 2 is a diagram 200 illustrating a fleet of autonomous vehicles 210a, 210b, 210c in communication with a central computer 202 according to some embodiments of the disclosure. As shown in FIG. 2, the vehicles 210a-210c may communicate wirelessly with a central computer 202 and a cloud 204. The central computer 202 may include a fleet management system 206, which may include a routing coordinator and a database of information from the vehicles 210a-210c in the fleet. Each vehicle 210a-210c can include respective onboard computer 220a-220c and sensor suites 222a-222c, which can be similar to the onboard computer 104 and sensor suites 102 of FIG. 1.

The central computer 202 (and more particularly the fleet management system 206) may receive rideshare service requests for one of the autonomous vehicles 210 from user devices 230. Autonomous vehicle fleet routing refers to the routing of multiple vehicles in a fleet. In some implementations, autonomous vehicles communicate directly with each other. For example, a user 235 may make a request for rideshare service using a mobile app executing on the user device 230. The user device 230 may transmit the request directly to the fleet management system 206. The fleet management system 206 dispatches one of the autonomous vehicles 210a-210c to carry out the service request. When the dispatched one of the autonomous vehicles 210a-210c arrives at the pick-up location (i.e., the location at which the user is to meet the autonomous vehicle to begin the rideshare service), the user may be notified by the mobile app to meet the autonomous vehicle.

When a ride request is received from a passenger, the routing coordinator may select an autonomous vehicle 210a-210c to fulfill the ride request and generates a route for the autonomous vehicle 210a-210c. As described herein, in some examples, the routing coordinator selects more than one autonomous vehicle 210a-210c to fulfill the ride request. The generated route includes a route from the autonomous vehicle's present location to the pick-up location, and a route from the pick-up location to the final destination. In some examples, the generated route includes a route from the pick-up location to a selected waypoint, and a route from the selected waypoint to the final destination. In some examples, a first autonomous vehicle 210a drives the route to the waypoint and a second autonomous vehicle 210b drives the route from the waypoint to the final destination. In various examples, the route includes multiple waypoints and multiple autonomous vehicles. In some implementations, the central computer 202 communicates with a second fleet of autonomous vehicles, and a vehicle from the second fleet of autonomous vehicles drives the route from the waypoint to the final destination.

Each vehicle 210a-210c in the fleet of vehicles may communicate with a routing coordinator. Information gathered by various autonomous vehicles 210a-210c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest time route for each autonomous vehicle. In some implementations, the routing coordinator uses collected position data to generate a best route for an autonomous vehicle in view of one or more traveling preferences and/or routing goals.

The routing coordinator uses map data to select an autonomous vehicle from the fleet to fulfill a ride request. In some implementations, the routing coordinator sends the selected autonomous vehicle the ride request details, including pick-up location and destination location, and an onboard computer (e.g., onboard computer 220a, 220b, or 220c) on the selected autonomous vehicle generates a route and navigates to the destination. In some examples, the routing coordinator also sends the selected vehicle one or more stops, including a charging station stop, for the autonomous vehicle to recharge. In some examples, the routing coordinator sends a first vehicle the pick-up location and a waypoint location, and the routing coordinator sends a second vehicle the waypoint location and the destination location, such that the passenger switches vehicles mid-ride. In some implementations, the routing coordinator in the central computer 202 generates a route for each selected autonomous vehicle 210a-210c, and the routing coordinator determines a route for the autonomous vehicle 210a-210c to travel from the autonomous vehicle's current location to a first stop.

Example Onboard Computer

Figure 3:
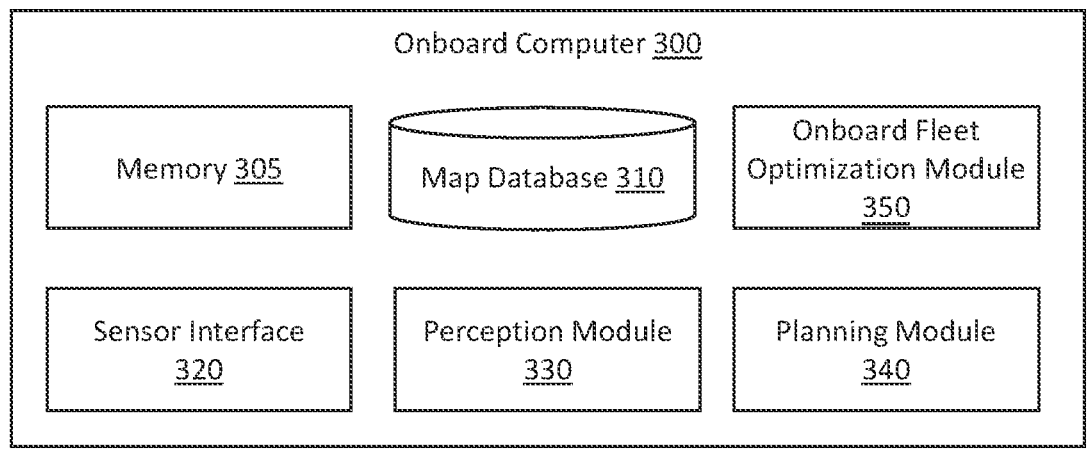
FIG. 3 is a diagram illustrating an onboard computer for enabling aspects of an example autonomous vehicle fleet optimization system for providing rideshare services according to some embodiments of the present disclosure.

FIG. 3 is a block diagram illustrating an onboard computer 300, which may be used to implement onboard computer 104 (FIG. 1) and onboard computers 220 (FIG. 2) for enabling features according to some embodiments of the present disclosure. The onboard computer 300 may include memory 305, a map database 310, a sensor interface 320, a perception module 330, a planning module 340, and an onboard fleet optimization module 350. In alternative configurations, fewer, different and/or additional components may be included in the onboard computer 300. For example, components and modules for controlling movements of the vehicles 110, 210, and other vehicle functions, and components and modules for communicating with other systems, such as central computer 202 and/or cloud 204, are not shown in FIG. 3. Further, functionality attributed to one component of the onboard computer 300 may be accomplished by a different component included in the onboard computer 300 or a different system from those illustrated.

The map database 310 stores a detailed map that includes a current environment of the vehicle. The map database 310 includes data describing roadways (e.g., locations of roadways, connections between roadways, roadway names, speed limits, traffic flow regulations, toll information, etc.) and data describing buildings (e.g., locations of buildings, building geometry, building types). The map database 310 may further include data describing other features, such as bike lanes, sidewalks, crosswalks, traffic lights, parking lots, etc.

The sensor interface 320 interfaces with the sensors in the sensor suite of the vehicle (e.g., sensor suite 140 (FIG. 1)). The sensor interface 320 may request data from the sensor suite, e.g., by requesting that a sensor capture data in a particular direction or at a particular time. The sensor interface 320 is configured to receive data captured by sensors of the sensor suite. The sensor interface 320 may have subcomponents for interfacing with individual sensors or groups of sensors of the sensor suite, such as a thermal sensor interface, a camera interface, a LIDAR interface, a RADAR interface, a microphone interface, etc.

The perception module 330 identifies objects in the environment of the vehicle. The sensor suite produces a data set that is processed by the perception module 330 to detect other cars, pedestrians, trees, bicycles, and objects traveling on or near a road on which the vehicle is traveling or stopped, and indications surrounding the vehicle (such as construction signs, traffic cones, traffic lights, stop indicators, and other street signs). For example, the data set from the sensor suite may include images obtained by cameras, point clouds obtained by LIDAR sensors, and data collected by RADAR sensors. The perception module 330 may include one or more classifiers trained using machine learning to identify particular objects. For example, a multi-class classifier may be used to classify each object in the environment of the vehicle as one of a set of potential objects, e.g., a vehicle, a pedestrian, or a cyclist. As another example, a human classifier recognizes humans in the environment of the vehicle, a vehicle classifier recognizes vehicles in the environment of the vehicle, etc.

The planning module 340 plans maneuvers for the vehicle based on map data retrieved from the map database 310, data received from the perception module 330, and navigation information, e.g., a route instructed by the fleet management system. In some embodiments, the planning module 340 receives map data from the map database 310 describing known, relatively fixed features and objects in the environment of the vehicle. For example, the map data includes data describing roads as well as buildings, bus stations, trees, fences, sidewalks, etc. The planning module 340 receives data from the perception module 330 describing at least some of the features described by the map data in the environment of the vehicle. The planning module 340 determines a pathway for the vehicle to follow. The pathway includes locations for the vehicle to maneuver to, and timing and/or speed of the vehicle in maneuvering to the locations.

The onboard fleet optimization module 350 may interact with the map database 310, sensor interface 320, and perception module 330 to control and provide various aspects of the functionality and features of embodiments described herein and particularly as described below with reference to FIGS. 5-7.

Example Fleet Management System

Figure 4:
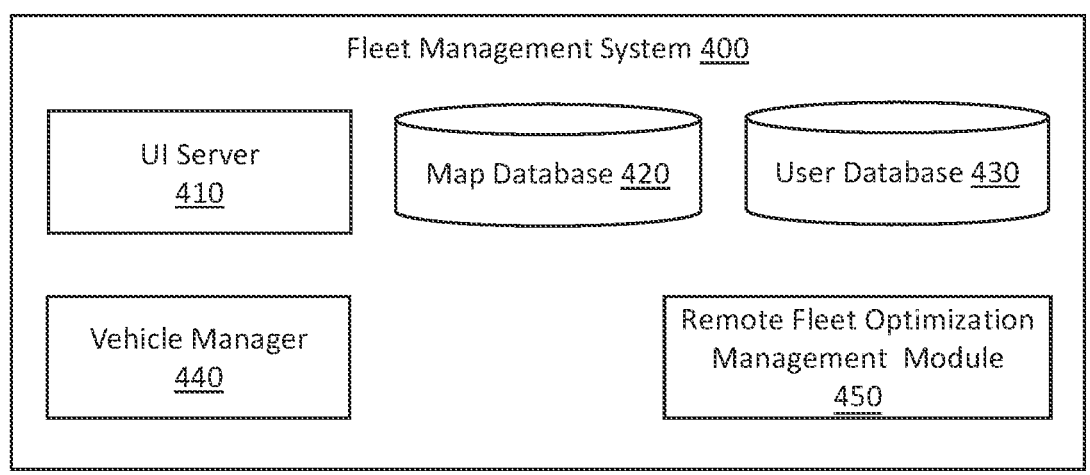
FIG. 4 is a diagram illustrating a fleet management system for managing a fleet of autonomous vehicles to enable aspects of an example autonomous vehicle fleet optimization system for providing rideshare services according to some embodiments of the present disclosure.

FIG. 4 is a block diagram illustrating a fleet management system 400, which may be implemented by central computer 202 (FIG. 2), according to some embodiments of the present disclosure. The fleet management system 400 includes a user interface (UI) server 410, a map database 420, a user database 430, a vehicle manager 440, and a remote fleet optimization management module 450. In alternative configurations, different, additional, or fewer components may be included in the fleet management system 400. Further, functionality attributed to one component of the fleet management system 400 may be accomplished by a different component included in the fleet management system 400 or a different system than those illustrated.

The fleet management system 400 manages a fleet of autonomous vehicles, such as autonomous vehicle 110. The fleet management system 400 may manage one or more services that provide or use the autonomous vehicles, e.g., a service for providing rides to users with the autonomous vehicles, or a service that delivers items, such as prepared foods, groceries, or packages, using the autonomous vehicles. The fleet management system 400 may select an autonomous vehicle from the fleet of autonomous vehicles to perform a particular service or other task and instruct the selected autonomous vehicle to autonomously drive to a particular location (e.g., a designated pick-up location) to pick-up a user and/or drop off an order to a user. The fleet management system 400 may select a route for the autonomous vehicle to follow. The fleet management system 400 may also manage fleet maintenance tasks, such as charging, servicing, and cleaning of the autonomous vehicle. As illustrated in FIG. 2, the autonomous vehicles may communicate with the fleet management system 400. The autonomous vehicle and the fleet management system 400 may connect over a public network, such as the Internet.

The UI server 410 is configured to communicate with client devices that provide a user interface to users. For example, the UI server 410 may be a web server that provides a browser-based application to client devices, or the UI server 410 may be a user app server that interfaces with a user app installed on client devices. The UI enables the user to access a service of the fleet management system 400, e.g., to request a ride from an autonomous vehicle, or to request a delivery from an autonomous vehicle. For example, the UI server 410 receives a request for a ride that includes an origin location (e.g., the user's current location) and a destination location, or a request for a delivery that includes a pick-up location (e.g., a local restaurant) and a destination location (e.g., the user's home address).

The map database 420 stores a detailed map describing roads and other areas (e.g., parking lots, autonomous vehicle service facilities) traversed by a fleet of autonomous vehicles, such as vehicles 210 (FIG. 2). The map database 420 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. At least a portion of the data stored in the map database 420 is provided to onboard computers of vehicles in the fleet, such as onboard computer 300 (FIG. 3), as a map database 310 (FIG. 3), described above.

The user database 430 stores data describing users of the fleet of vehicles managed by fleet management system 400. Users may create accounts with the fleet management system 400, which stores user information associated with the user accounts, or user profiles, in the user database 430. The user information may include identifying information (name, username), password, payment information, home address, contact information (e.g., email and telephone number), and information for verifying the user (e.g., photograph, driver's license number). Users may provide some or all of the user information, including user preferences regarding certain aspects of services provided by the rideshare system, to the fleet management system 400. In some embodiments, the fleet management system 400 may infer some user information from usage data or obtain user information from other sources, such as public databases or licensed data sources.

The fleet management system 400 may learn one or more home addresses for a user based on various data sources and user interactions. The user may provide a home address when setting up his account, e.g., the user may input a home address, or the user may provide an address in conjunction with credit card information. In some cases, the user may have more than one home, or the user may not provide a home address, or the user-provided home address may not be correct (e.g., if the user moves and the home address is out of date, or if the user's address associated with the credit card information is not the user's home address). In such cases, the fleet management system 400 may obtain a home address from one or more alternate sources. In one example, the fleet management system 400 obtains an address associated with an official record related to a user, such as a record from a state licensing agency (e.g., an address on the user's driver's license), an address from the postal service, an address associated with a phone record, or other publicly available or licensed records. In another example, the fleet management system 400 infers a home address based on the user's use of a service provided by the fleet management system 400. For example, the fleet management system 400 identifies an address associated with at least a threshold number of previous rides provided to a user (e.g., at least 10 rides, at least 50% of rides, or a plurality of rides), or at least a threshold number of previous deliveries (e.g., at least five deliveries, at least 60% of deliveries) as a home address or candidate home address. The fleet management system 400 may look up a candidate home address in the map database 420 to determine if the candidate home address is associated with a residential building type, e.g., a single-family home, a condominium, or an apartment. The fleet management system 400 stores the identified home address in the user database 430. The fleet management system 400 may obtain or identify multiple addresses for a user and associate each address with the user in the user database 430. In some embodiments, the fleet management system 400 identifies a current home address from multiple candidate home addresses, e.g., the most recent address, or an address that the user rides to or from most frequently and flags the identified current home address in the user database 430.

The vehicle manager 440 directs the movements of the vehicles in the fleet managed by fleet management system 400 (e.g., vehicles 210 (FIG. 2)). The vehicle manager 440 receives service requests from users from the UI server 410, and the vehicle manager 440 assigns service requests to individual vehicles. For example, in response to a user request for transportation from an origin location to a destination location, the vehicle manager 440 selects a vehicle and instructs the vehicle to drive to the origin location (e.g., a passenger or delivery pick-up location), and then instructs the vehicle to drive to the destination location (e.g., the passenger or delivery destination location). In addition, the vehicle manager 440 may instruct vehicles to drive to other locations while not servicing a user, e.g., to improve geographic distribution of the fleet, to anticipate demand at particular locations, to drive to a charging station for charging, etc. The vehicle manager 440 also instructs vehicles to return to autonomous vehicle facilities for recharging, maintenance, or storage.

The remote fleet optimization module 450 manages various aspects of features and functionality of embodiments described herein and particularly as described below with reference to FIGS. 5-7.

Example Method for Fleet Optimization Implementation and Operation

Figure 5:
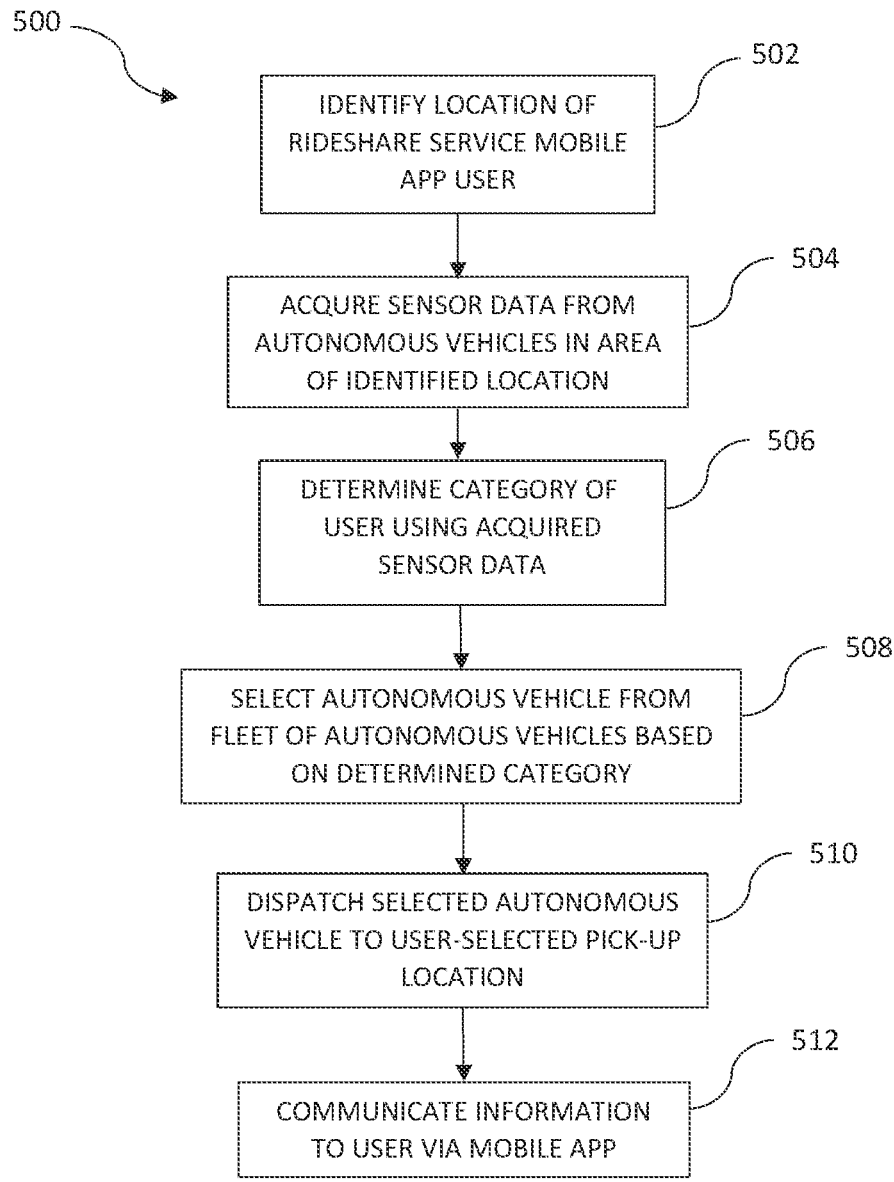
FIGS. 5-7 are flowcharts illustrating example processes of an example autonomous vehicle fleet optimization system for providing rideshare services according to some embodiments of the present disclosure.
Figure 6:
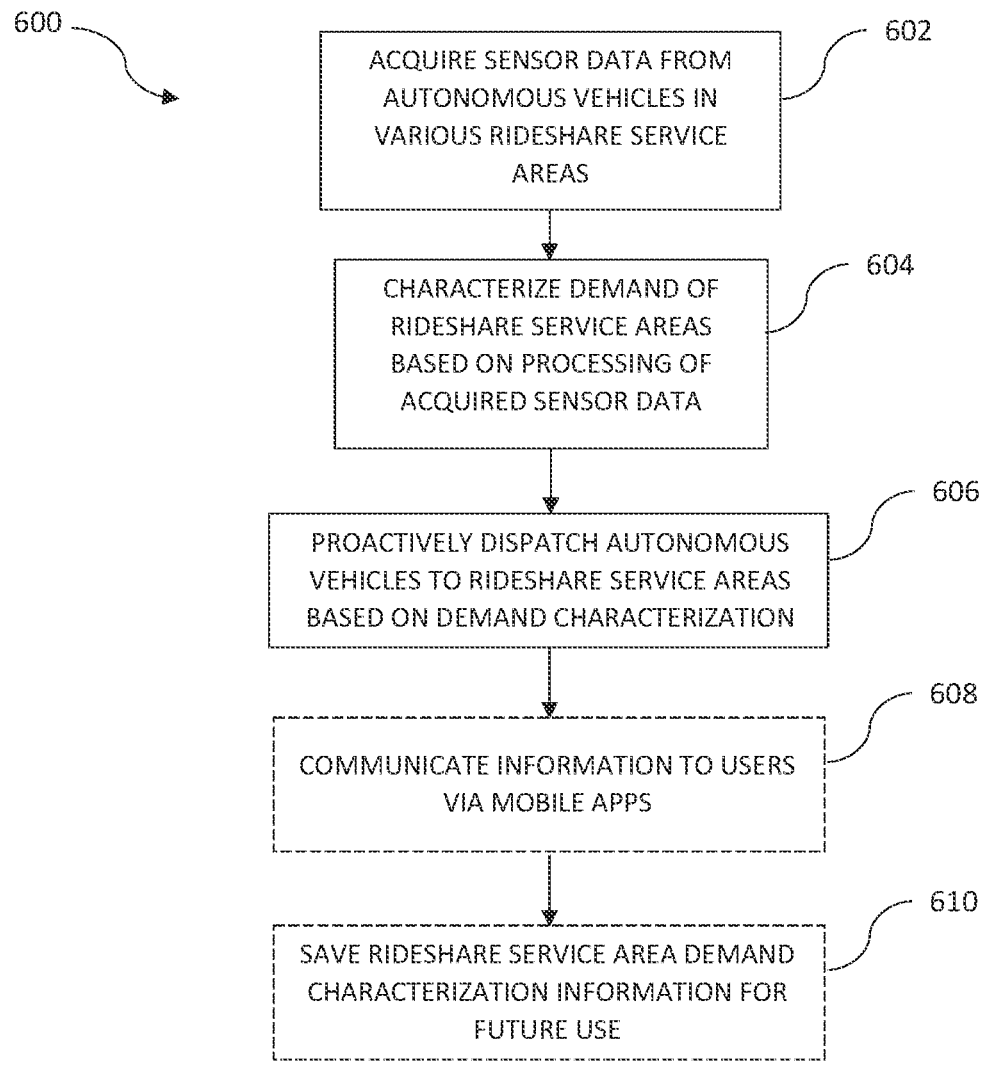
Figure 7:
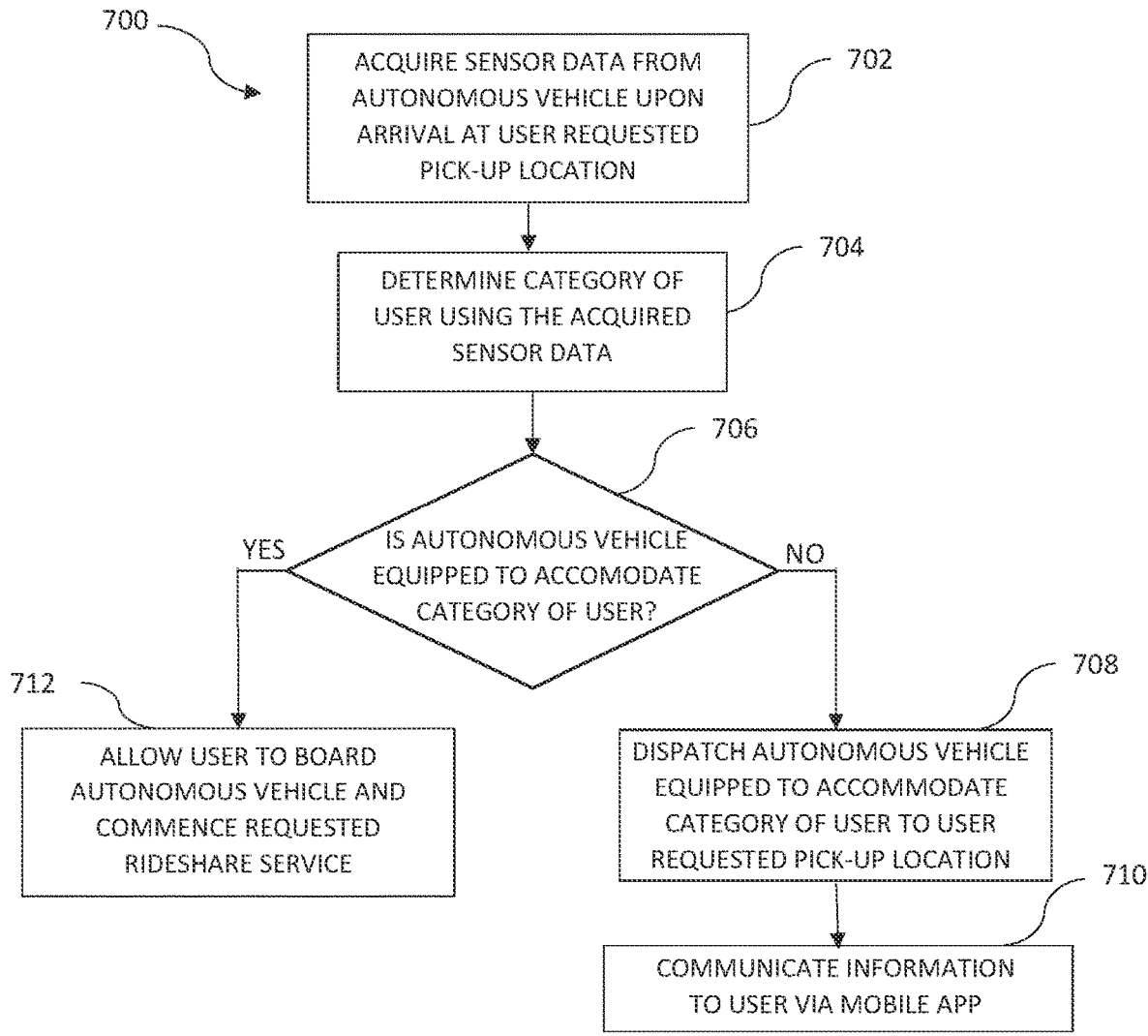

FIGS. 5-7 are flowcharts illustrating example processes for a fleet optimization system for an autonomous vehicle rideshare service according to some embodiments of the present disclosure. One or more of the steps illustrated in FIGS. 5-7 may be executed by one or more of the elements shown in FIGS. 3 and 4.

FIG. 5 is a flowchart illustrating an example method 500 for autonomous vehicle fleet optimization in accordance with features of embodiments described herein.

In step 502, in response to a rideshare request submitted by a user (e.g., via a UI of a mobile app of the rideshare service provider), a location of the user is identified. In some situations, the location of the user may coincide with a pick-up location indicated by the user in the rideshare request. In other situations, such as when the user has not yet arrived at the indicated pick-up location, the location of the user may be other than the indicated pick-up location.

In step 504, sensor data from one or more autonomous vehicles near the identified location is acquired. In certain embodiments, the acquired sensor data may include CV and/or LIDAR data including images of the user, as well as individuals and/or items in the vicinity of/in close proximity to the user.

In step 506, the acquired sensor data is processed to determine a category of the user. For example, the processed sensor data may indicate that the user is in a group of two or more individuals who are likely to be sharing the requested rideshare service. Additionally and/or alternatively, the processed sensor data may indicate that the user (and/or the group of individuals associated with the user) require certain accommodations, such as space for large items (e.g., large luggage or a stroller), a bike rack, wheelchair accommodation. Still further, the processed sensor data may indicate that one or more of the individuals of the group associated with the user is a child or infant and/or that the user or one or more of the individuals of the group associated with the user is accompanied by a service animal. In short, the acquired sensor data may be processed to determine any number of qualities/characteristics of the user and/or associated with the user's rideshare request that may be addressed by particular configurations/equipment of one or more autonomous vehicles of the autonomous vehicle fleet.

In step 508, an autonomous vehicle that is equipped to accommodate the determined category of user is dispatched to the requested pick-up location. For example, if it is determined by processing the acquired sensor data that the user is accompanied by three other individuals who appear to be planning to share the rideshare service with the user and that one of the individuals of the group of individuals is in a wheelchair, an autonomous vehicle that can accommodate four individuals including a wheelchair may be dispatched to the requested pick-up location. In another example, if it is determined by processing the acquired sensor data that the user is alone but has four large suitcases in their possession, an autonomous vehicle with a large cargo area may be dispatched to the requested pick-up location. In yet another example, if it is determined by processing the acquired sensor data that the user has a bicycle, an autonomous vehicle with a bike rack may be dispatched to the requested pick-up location. It will be recognized that, while several examples of categories of users and types of autonomous vehicle accommodations have been provided, the list of examples is not intended to be exhaustive or limiting and that autonomous vehicles may be equipped to accommodate other categories and/or types of users in a variety of manners without departing from the spirit or scope of embodiments described herein.

In step 512, prior to and/or upon arrival of the dispatched autonomous vehicle at the requested pick-up location, information and/or instructions may be communicated to the user via the UI of the user's mobile app. For example, the user may be informed of the accommodations of the autonomous vehicle being dispatched, thereby to reassure the user that the autonomous vehicle will be able to meet the needs the user and/or their group. Additionally and/or alternatively, the user may be provided with instructions regarding how to use the equipment of the autonomous vehicle, such as how to load their bike into (and remove their bike from) the bike rack, for example, or how to secure their wheelchair within (and release their wheelchair from) a wheelchair restraint system, for example.

FIG. 6 is a flowchart illustrating an example method 600 for autonomous vehicle fleet optimization in accordance with features of embodiments described herein.

In step 602, sensor data from autonomous vehicles of a fleet of autonomous vehicles in various rideshare services areas is acquired. In certain embodiments, the acquired sensor data may include CV and/or LIDAR data including images of the individuals, groups of individuals, and items in the vicinity of/in close proximity to the individuals and groups of individuals.

In step 604, the sensor data is processed to characterize the potential demand for rideshare services in the various rideshare service areas based on the acquired sensor data. For example, processing of the sensor data may indicate a large number of potential rideshare users seemingly unassociated with other individuals (i.e., single rideshare users) in a first rideshare service area. Additionally and/or alternatively, processing of the sensor data may indicate associated (or "clustered") individuals in a second rideshare service area, which clusters may correspond to groups of individuals who may want to share a rideshare service requested by one individual in their group. Additionally and/or alternatively, processing of the sensor data may indicate that a predominance of individuals in a third rideshare service area have in their possession large suitcases, as may be the case in a rideshare service area in which one or more hotels are located. It will be recognized that other reasons for specialized/temporal/geographical demand in a rideshare area may include inclement weather, in which case individuals who may have planned to walk to a destination may instead decide to seek refuge in a readily available rideshare vehicle, or the conclusion of a large event, in which case large numbers of event-goers may be requesting rideshare services at approximately the same time.

In step 606, autonomous vehicles are dispatched to each of the various rideshare service areas in accordance with the demand for rideshare services identified using the processed sensor data. For example, a sizable percentage of the smaller autonomous vehicles of the fleet may be dispatched to the first rideshare service area to service what appears to be a demand for individual rides, while more of the larger (XL) vehicles of the fleet may be dispatched to the second rideshare service area to service what appears to be a demand for vehicles that can accommodate groups of riders. Finally, a sizable number of the vehicles having larger than average cargo space may be dispatched to the third rideshare service area to accommodate the luggage and other items that appear to be common in the area. It will be recognized that, while several examples of response to rideshare service area demand have been provided, the list of examples is not intended to be exhaustive or limiting and that characterization of and response to apparent demand may be accomplished in a variety of manners without departing from the spirit or scope of embodiments described herein.

In optional step 608, information regarding dispatch of autonomous vehicles to a particular rideshare service area may be communicated to users located in the rideshare service area via the mobile app. For example, an alert may be provided to a category of users in a rideshare area to which autonomous vehicles equipped to accommodate their perceived rideshare needs have been recently dispatched to proactively apprise the users of an estimated time of arrival (ETA) of vehicles to their area.

In optional step 610, the information regarding characterization of vehicle demand in various rideshare service areas may be saved in connection with map data and other historical data for future use in populating demand profiles associated with various geographical areas at various times of day.

FIG. 7 is a flowchart illustrating an example method 700 for autonomous vehicle fleet optimization in accordance with features of embodiments described herein.

In certain embodiments, when requesting a rideshare service via the mobile app, the user may be presented with an opportunity to "self-categorize," e.g., by indicating a total number of individuals participating in the rideshare service and/or special accommodations required by the user and/or the user's group. It will be recognized that, due to distraction and/or other issues, the user may provide inaccurate self-categorization information or may neglect to provide self-categorization information. In such situations, as well as in situations in which the mobile app is not configured to request/receive self-categorization information, when there are no other vehicles in the area to preemptively categorize the user, embodiments provided herein enable the dispatched autonomous vehicle to categorize the user upon arrival at the requested user pick-up location.

Referring again to FIG. 7, in step 702, upon arrival of an autonomous vehicle at a pick-up location requested by a user, sensor data from the autonomous vehicle is acquired. In certain embodiments, the acquired sensor data may include CV and/or LIDAR data including images of the user, as well as individuals and/or items in the vicinity of/in close proximity to the user. It will be noted that in this step, sensor data from other autonomous vehicles in the area may also be acquired.

In step 704, the acquired sensor data is processed to determine a category of the user. For example, the processed sensor data may indicate that the user is in a group of two or more individuals who are likely to be sharing the requested rideshare service. Additionally and/or alternatively, the processed sensor data may indicate that the user (and/or the group of individuals associated with the user) require certain accommodations, such as space for large items (e.g., large luggage or a stroller), a bike rack, wheelchair accommodation. Still further, the processed sensor data may indicate that one or more of the individuals of the group associated with the user is a child or infant and/or that the user or one or more of the individuals of the group associated with the user is accompanied by a service animal. In short, the acquired sensor data may be processed to determine any number of qualities/characteristics of the user and/or associated with the user's rideshare request that may be addressed by particular configurations/equipment of one or more autonomous vehicles of the autonomous vehicle fleet.

In step 706, a determination is made whether the autonomous vehicle is equipped to accommodate the category of the user. For example, if the user is actually a group of individuals, the autonomous vehicle might be determined not to include enough seats to accommodate the number of individuals in the group. As another example, if the user has a number of large packages and/or suitcases, the autonomous vehicle might be determined not to include enough cargo space to hold the items. If it is determined that the autonomous vehicle is not equipped to accommodate the category of the user, execution proceeds to step 708.

In step 708, an autonomous vehicle better equipped to accommodate the category of the user is dispatched to the user requested pick-up location.

In step 710, information is communicated to the user via the mobile app. In particular, the user may be advised that the current autonomous vehicle is not equipped to accommodate the user and/or the user's group and that an alternative is being dispatched. An ETA may also be provided for the alternative autonomous vehicle.

If in step 706 it is determined that the autonomous vehicle is equipped to accommodate the category of the user, in step 712, the user is allowed to board the autonomous vehicle and the requested rideshare service commences in the usual manner.

Although the operations of the example methods shown in FIGS. 5-7 are illustrated as occurring once each and in a particular order, it will be recognized that the operations may be performed in any suitable order and repeated as desired. Additionally, one or more operations may be performed in parallel. Furthermore, the operations illustrated in FIGS. 5-7 may be combined or may include more or fewer details than described.

Select Examples

Example 1 provides a method comprising acquiring sensor data produced by sensors of a plurality of vehicles traversing an area including a location of a user, wherein the vehicles traversing the area comprise a subset of a fleet of vehicles for providing rideshare services; processing the acquired sensor data to determine a category of the user; selecting a vehicle from the fleet of vehicles based on the category of the user, wherein the selected vehicle comprises at least one accommodation corresponding to the category of the user; and dispatching the selected vehicle to a pick-up location designated by the user.

Example 2 provides the method of example 1, further comprising, subsequent to the acquiring, communicating information to the user using a mobile app.

Example 3 provides the method of example 2, wherein the communicated information includes instructions regarding how to use the at least one accommodation of the selected vehicle.

Example 4 provides the method of example 2, wherein the communicated information advises the user that the selected vehicle includes the at least one accommodation.

Example 5 provides the method of any of examples 1-4, wherein the category of the user comprises a user with a special need.

Example 6 provides the method of example 5, wherein the special need comprises accommodations for at least one of a wheelchair, large cargo, a bicycle, a child, an infant, and an animal.

Example 7 provides the method of any of examples 1-4, wherein the category of the user indicates that the user is a part of a group of individuals associated with a requested ride share service.

Example 8 provides the method of example 7, wherein the category of the user indicates that the group of individuals includes at least one of a child and an infant.

Example 9 provides the method of an of examples 1-4, wherein the sensor data comprises at least one of computer vision (CV) data and light detection and ranging (LIDAR) data.

Example 10 provides the method of any of examples 1-4, wherein the user location corresponds to the pick-up location.

Example 11 provides a dispatch system configured to process sensor data acquired by a plurality of vehicles traversing an area including a location of a user to determine a category of the user, wherein the vehicles traversing the area comprise a subset of a fleet of vehicles for providing rideshare services and wherein each of the vehicles traversing the area includes at least one sensor for acquiring sensor data; select a vehicle from the fleet of vehicles based on the category of the user, wherein the selected vehicle comprises at least one accommodation corresponding to the category of the user; and dispatch the selected vehicle to a pick-up location designated by the user.

Example 12 provides the dispatch system of example 11, further configured to, subsequent to the acquiring, communicate information to the user using a mobile app.

Example 13 provides the dispatch system of example 12, wherein the communicated information includes instructions regarding how to use the at least one accommodation of the selected vehicle.

Example 14 provides the dispatch system of example 12, wherein the communicated information advises the user that the selected vehicle includes the at least one accommodation.

Example 15 provides the dispatch system of any of examples 11-14, wherein the category of the user comprises a user with a special need.

Example 16 provides the dispatch system of example 15, wherein the special need comprises accommodations for at least one of a wheelchair, large cargo, a bicycle, a child, an infant, and an animal.

Example 17 provides the dispatch system of any of claims 11-14, wherein the category of the user indicates that the user is a part of a group of individuals associated with a requested ride share service.

Example 18 provides the dispatch system of example 17, wherein the category of the user indicates that the group of individuals includes at least one of a child and an infant.

Example 19 provides the dispatch system of any of examples 11-14, wherein the sensor comprises at least one of a computer vision (CV) sensor and a light detection and ranging (LIDAR) sensor.

Example 20 provides the dispatch system of any of examples 11-14, wherein the user location corresponds to the pick-up location.

Example 21 provides a method comprising acquiring sensor data produced by sensors of a first plurality of vehicles traversing a rideshare service area, wherein the vehicles traversing the area comprise a subset of a fleet of vehicles for providing rideshare services; processing the acquired sensor data to characterize a rideshare service demand associated with the rideshare service area; selecting a second plurality of vehicles from the fleet of vehicles based on the characterized rideshare service demand associated with the rideshare service area, wherein each of the selected second plurality of vehicles comprises at least one accommodation corresponding to the characterized rideshare service demand associated with the rideshare service area; and dispatching the second plurality of vehicles to the identified rideshare service area.

Example 22 provides the method of example 21, wherein the at least one accommodation comprises an accommodation for at least one of a wheelchair, large cargo, a bicycle, a child, an infant, and an animal.

Example 23 provides the method of example 21, wherein the at least one accommodation comprises a designated number of available seats.

Example 24 provides the method of any of examples 21-23, wherein the sensor data comprises at least one of computer vision (CV) data and light detection and ranging (LIDAR) data.

Example 25 provides the method of any of examples 21-23, further comprising storing the acquired sensor data for future use.

Example 26 provides the method of any of examples 21-23, further comprising, subsequent to the acquiring, communicating information to a user in the rideshare service area using a mobile app, wherein the information comprises an alert advising the user of the dispatching of the second plurality of vehicles to the rideshare service area.

Example 27 provides the method of any of examples 21-23, wherein the rideshare service area comprises a plurality of rideshare service areas.

Example 28 provides a method comprising acquiring sensor data produced by sensors of a vehicle upon arrival of the vehicle at a pick-up location identified by a user; processing the acquired sensor data to determine a category of the user; determining that the vehicle is not equipped to accommodate the category of the user; and subsequent to the determining, dispatching a second vehicle to the pick-up location, wherein the second vehicle is selected from a fleet of vehicles based on the category of the user, wherein the second vehicle comprises at least one accommodation corresponding to the category of the user.

Example 29 provides the method of example 28, further comprising, subsequent to the acquiring, communicating information to the user using a mobile app.

Example 30 provides the method of example 29, wherein the communicated information advises the user that the first vehicle is not equipped to accommodate the category of the user and that the second vehicle has been dispatched.

Example 31 provides method of example 30, wherein the communicated information includes an estimated time of arrival of the second vehicle.

Example 32 provides the method of any of examples 28-31, wherein the category of the user comprises a user with a special need.

Example 33 provides the method of example 32, wherein the special need comprises accommodations for at least one of a wheelchair, large cargo, a bicycle, a child, an infant, and an animal.

Example 34 provides the method of any of examples 28-31, wherein the category of the user indicates that the user is a part of a group of individuals associated with a requested ride share service.

Example 35 provides the method of example 34, wherein the category of the user indicates that the group of individuals includes at least one of a child and an infant.

Example 36 provides the method of any of examples 28-31, wherein the sensor data comprises at least one of computer vision (CV) data and light detection and ranging (LIDAR) data.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A method comprising:
receiving a rideshare service request from a user;
identifying a location of the user subsequent to receipt of the rideshare service request, wherein the rideshare service request designates a pick-up location different than the identified location of the user;
acquiring sensor data produced by sensors of a plurality of vehicles traversing an area including the identified location of the user, wherein the vehicles traversing the area comprise a subset of a fleet of vehicles for providing rideshare services;
processing the acquired sensor data to determine a category of the user, wherein the category of the user indicates that the user is traveling with at least one of a child and an animal;
selecting a vehicle from the fleet of vehicles based on the category of the user, wherein the selected vehicle is equipped with at least one accommodation corresponding to the category of the user;
alerting the user that the selected vehicle is equipped with the at least one accommodation corresponding to the category of the user;
sending by a controller a control signal to an onboard computer of the selected vehicle; and
maneuvering the selected vehicle, by the onboard computer, to the designated pick-up location based on the control signal, the onboard computer communicating with an interface of a vehicle control system of the selected vehicle and causing movement of the selected vehicle along a route to the designated pick-up location by the vehicle control system.

2. The method of claim 1, further comprising, subsequent to the acquiring, communicating information to the user using a mobile app.

3. The method of claim 2, wherein the communicated information includes instructions regarding how to use the at least one accommodation of the selected vehicle.

4. The method of claim 2, wherein the communicated information advises the user that the selected vehicle includes the at least one accommodation.

5. The method of claim 1, wherein the category of the user comprises a user with a special need.

6. The method of claim 5, wherein the special need comprises accommodations for at least one of a wheelchair, large cargo, a bicycle, a child, an infant, and an animal.

7. The method of claim 1, wherein the category of the user indicates that the user is a part of a group of individuals associated with a requested rideshare service.

8. The method of claim 1, wherein the sensor data comprises at least one of computer vision (CV) data and light detection and ranging (LIDAR) data.

9. A method comprising:
acquiring sensor data produced by sensors of a first plurality of vehicles traversing a rideshare service area, wherein the vehicles traversing the rideshare service area comprise a subset of a fleet of vehicles for providing rideshare services and wherein the acquiring is not in response to a rideshare service request by a user;
processing the acquired sensor data to characterize a potential rideshare service demand associated with the rideshare service area, wherein the potential rideshare service demand associated with the rideshare service area is characterized at least in part by a number of individuals in the rideshare service area traveling with at least one of a child and an animal, a number of groups of individuals in the rideshare area, and demographics of the individuals and the groups in the rideshare area;

selecting a second plurality of vehicles from the fleet of vehicles based on the characterized potential rideshare service demand associated with the rideshare service area, wherein each of the selected second plurality of vehicles is equipped with at least one accommodation corresponding to the characterized potential rideshare service demand associated with the rideshare service area;

sending by a controller, based on the processing, a control signal to a respective onboard computer of each of the second plurality of vehicles;

maneuvering each of the selected plurality of vehicles, by the respective onboard computer in communication with an interface of a respective vehicle control system, to the rideshare service area based on the control signal received from the controller, the respective vehicle control system causing movement of the respective vehicle along a generated route to the rideshare service area; and alerting at least one of the number of individuals in the identified rideshare service area that the second plurality of vehicles have been dispatched to the identified rideshare service area and that the second plurality of vehicles are equipped with the at least one accommodation corresponding characterized potential rideshare service demand associated with the identified rideshare service area.

10. The method of claim 9, wherein the at least one accommodation comprises an accommodation for at least one of a wheelchair, large cargo, a bicycle, a child, an infant, and an animal.

11. The method of claim 9, wherein the at least one accommodation comprises a designated number of available seats.

12. The method of claim 9, wherein the sensor data comprises at least one of computer vision (CV) data and light detection and ranging (LIDAR) data.

13. The method of claim 9, further comprising storing the acquired sensor data for future use.

14. The method of claim 9, further comprising, subsequent to the acquiring, communicating information to a user in the rideshare service area using a mobile app, wherein the information comprises an alert advising the user of the dispatching of the second plurality of vehicles to the rideshare service area.

15. The method of claim 9, wherein the rideshare service area comprises a plurality of rideshare service areas.

16. A method comprising:
acquiring sensor data produced by sensors of a first plurality of vehicles traversing a rideshare service area, wherein the vehicles traversing the rideshare service area comprise a subset of a fleet of vehicles for providing rideshare services and wherein the acquiring is not in response to a rideshare service request by a user;

acquiring from a database historical data characterizing historical demand in the rideshare service area;

processing the acquired sensor data and the historical data to characterize a potential rideshare service demand associated with the rideshare service area, wherein the potential rideshare service demand associated with the rideshare service area is characterized at least in part by a number of individuals in the rideshare service area traveling with at least one of a child and an animal, a number of groups of individuals in the rideshare area, and demographics of the individuals and the groups in the rideshare area;

selecting a second plurality of vehicles from the fleet of vehicles based on the characterized potential rideshare service demand associated with the rideshare service area, wherein each of the selected second plurality of vehicles is equipped with at least one accommodation corresponding to the characterized potential rideshare service demand associated with the rideshare service area;

sending by a controller, based on the processing, a control signal to a respective onboard computer of each of the second plurality of vehicles; and maneuvering each of the second plurality of vehicles, by the respective onboard computer in communication with an interface of a respective vehicle control system, to the rideshare service area based on the control signal received from the controller, the respective vehicle control system causing movement of the respective vehicle along a generated route to the rideshare service area.

17. The method of claim 16, wherein the at least one accommodation comprises an accommodation for at least one of a wheelchair, large cargo, a bicycle, a child, an infant, and an animal and a designated number of available seats.

18. The method of claim 16, further comprising storing the acquired sensor data for future use.

19. The method of claim 16, further comprising, subsequent to the acquiring, communicating information to a user in the rideshare service area using a mobile app, wherein the information comprises an alert advising the user of the dispatching of the second plurality of vehicles to the rideshare service area.

20. The method of claim 16, wherein the rideshare service area comprises a plurality of rideshare service areas.

* * * * *